United States Patent [19]

Matsue

[11] 3,872,321

[45] Mar. 18, 1975

[54] INVERTER CIRCUIT EMPLOYING FIELD EFFECT TRANSISTORS

[75] Inventor: Shigeki Matsue, Tokyo, Japan

[73] Assignee: Nippon Electric Company, Ltd., Tokyo, Japan

[22] Filed: Sept. 21, 1973

[21] Appl. No.: 399,541

[30] Foreign Application Priority Data

Sept. 25, 1972 Japan ............................... 47-95966

[52] U.S. Cl. ............ 307/205, 307/214, 307/221 C, 307/246

[51] Int. Cl.. H03k 19/08, H03k 19/40, H03k 23/24

[58] Field of Search ........... 307/205, 214, 251, 246, 307/279, 221 C

[56] References Cited

UNITED STATES PATENTS

| | | | |
|---|---|---|---|
| 3,621,291 | 11/1971 | Fujimoto | 307/205 X |
| 3,641,370 | 2/1972 | Heimbigner | 307/205 X |
| 3,649,843 | 3/1972 | Redwine et al. | 307/205 X |
| 3,660,684 | 5/1972 | Padgett et al. | 307/251 X |
| 3,710,271 | 1/1973 | Putman | 307/205 X |
| 3,736,522 | 5/1973 | Padgett | 307/251 X |
| 3,769,528 | 10/1973 | Chu et al. | 307/279 X |

OTHER PUBLICATIONS

Hsieh et al., "Mosfet Storage Array Addressing System"; IBM Tech. Discl. Bull., Vol. 13, No. 8, pp. 2383–2384; 1/1971.

*Primary Examiner*—Rudolph V. Rolinec
*Assistant Examiner*—L. N. Anagnos
*Attorney, Agent, or Firm*—John M. Calimafde

[57] ABSTRACT

An improved semiconductor inverter circuit, when used alone or in cascaded pluralities, consumes little or no power at steady state. Each inverter stage employs load and switching transistors serially connected across power supply terminals, all transistors advantageously but not necessarily being of the insulated gate field effect (IGFET) type. A bootstrap capacitor is connected across the gate and source of the load transistor, and a third IGFET employed to selectively charge and discharge the capacitor.

4 Claims, 5 Drawing Figures

INVERTER CIRCUIT EMPLOYING FIELD EFFECT TRANSISTORS

DISCLOSURE OF INVENTION

The present invention relates to an inverter circuit employing insulated gate field-effect transistors (hereinbelow referred to as "IGFET's"), and more particularly to a bootstrap inverter circuit.

A variety of circuits are manufactured utilizing IGFET's such as memory and operational configurations. Included among the parameters representative of the performance of a circuit employing IGFET's is the circuit power consumption. In some memory circuits of recent interest, various arrangements of low or null power consumption are requested. In general, inverter circuits are extensively used in memory circuits, operational circuits, and the like, and a number of inverter circuits are often interconnected in use. Accordingly, the power consumption of the inverter circuits must be as low as possible.

Prior art inverter circuits, including those of the boot-strap type, however, necessarily consume power when a switching transistor in the inverter is "on", i.e., is conducting. For this reason, in a circuit arrangement in which a number of inverter circuits are employed, each of them consumes power.

An object of the present invention is to provide a boot-strap inverter circuit with no power consumption.

Another object of the present invention is to provide a circuit arrangement, including a plurality of inverter circuit stages, in which the power consumption can be made null, at least during a certain phase interval.

The bootstrap inverter circuit according to the present invention is characterized by a switching transistor receiving an input signal, a load transistor comprising an IGFET implementation for the switching transistor, a second IGFET whose gate electrode is connected to a power source, one of the source and drain electrodes of the second IGFET being connected to the gate electrode of the load transistor, the other electrode being connected to a control signal source for the load transistor, and a capacitor connected between the gate and source electrodes of the load transistor.

The present invention, and pertinent prior circuitry, will be described in detail with reference to the accompanying drawings, in which.

Figure 1:
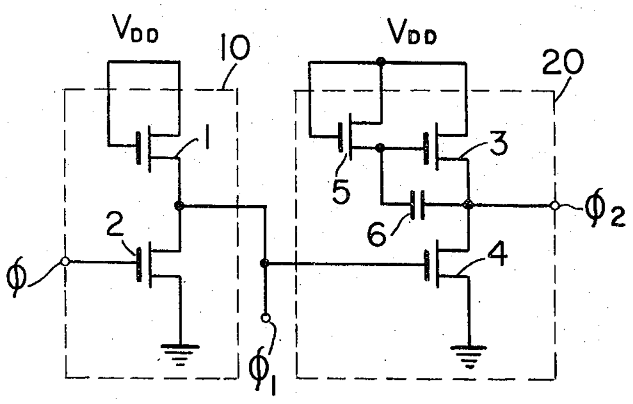
(PRIOR ART) FIG. 1
FIG. 1 is a circuit diagram depicting two cascaded stages of prior art inverter circuits.

In the following discussion, for purposes of illustration, N-channel type MOS transistors are taken as a specific example of transistors applicable to the present invention. Referring now to FIG. 1, a conventional prior art inverter circuit 10 is formed of a load transistor 1 and a switching transistor 2. The input of the inverter circuit 10 is the gate of the transistor 2, while the output is the drain of the same device. The output $\phi_1$ comprises the inverted or complement signal of the input signal $\phi$. If the input $\phi$ is at a low level, the transistor 2 turns off, and the output $\phi_1$ is brought to a high level by the load transistor 1. When this condition obtains, the high output $\phi_1$ is at a level which is lower than supply voltage $V_{DD}$ by the threshold voltage $V_{TH}$ of the transistor 1. If the input $\phi$ is high, the transistor 2 turns on, and the output $\phi_1$ falls to its low level condition.

The inverter circuit 10 does not consume any power when the output $\phi_1$ is at its high level, since no current flows through the transistors 1 and 2. However, when the output $\phi_1$ is low, the circuit consumes power since current flows from the power source $V_{DD}$ through the transistors 1 and 2 to ground.

The second stage inverter circuit 20 in FIG. 1 is constructed such that a transistor 5 and a capacitor 6 are added to an inverter circuit comprising a load transistor 3 and a switching transistor 4. A circuit of such construction is generally termed a bootstrap circuit. The gate and drain of the transistor 5 are connected to the power source $V_{DD}$, while the source is connected directly to the gate of the load transistor 3 and, through the capacitor 6, to the drain of the switching transistor 4.

The output $\phi_1$ of the first stage inverter circuit 10 forms the input of the next stage inverter circuit 20. When the input $\phi_1$ of the inverter circuit 20 changes from the high level to the low level, the output $\phi_2$ increases to the level of the power source $V_{DD}$, and attains its high level, by the action of capacitor 6. The inverter circuit 20 also consumes power when the output $\phi_2$ is low. Accordingly, the cascade-connected circuit produces signals $\phi_1$ and $\phi_2$ of an opposite phase, and consumes power, since one or the other of transistors 2 or 4 is always conducting.

Figure 2:
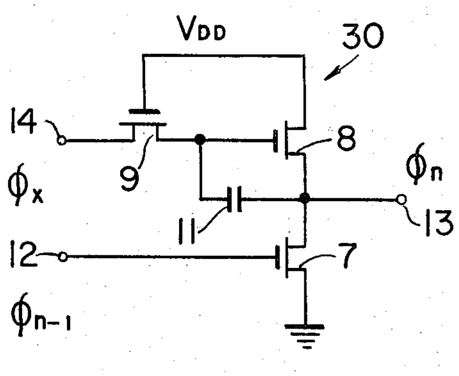
FIG. 2 is a circuit diagram of an embodiment of the present invention.
Figure 3:
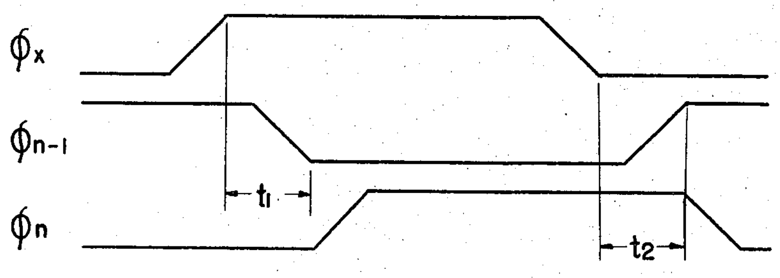
FIG. 3 is a timing waveform characterizing the circuit of FIG. 2.

FIG. 2 shows a bootstrap inverter circuit 30 embodying the principles of the present invention, while FIG. 3 shows timing wave forms for the circuit 30. Referring to these figures, the source of a load transistor 8 is connected to the drain of a switching transistor 7, the load transistor 8 thus being coupled in series with the switching transistor 7. The drain of the load transistor 8 is connected to a power source $V_{DD}$. The source of the switching transistor 7 is grounded. The gate and drain of the switching transistor 7 are connected to an input terminal 12 and an output terminal 13, respectively. The drain of a transistor 9 is connected to the gate of the load transistor 8, the gate of device 9 being connected to the power source $V_{DD}$. The source of the transistor 9 is connected to a control terminal 14. In addition, a capacitor 11 is connected between the gate and source of the load transistor 8. The input terminal of this circuit 30 may be connected to an output terminal of another inverter circuit such as $\phi_1$ of the conventional inverter 10, $\phi_2$ of the other conventional circuit 20, or an output terminal 13 of another inverter circuit 30 of this invention.

A binary input signal $\phi_{n-1}$ is applied to the input terminal 12, which assumes either a high level ($V_{DD}$) or a low level (a ground or zero potential). A binary signal $\phi_x$ is applied to the control terminal 14. The binary control signal $\phi_x$ also assumes a high ($V_{DD}$) or a low (ground) level, which is essentially the inverse of the level of the input signal $\phi_{n-1}$. However, the control signal $\phi_x$ should rise from a low level to the high level within a time sufficient for the capacitor 11 to be charged up before the input signal $\phi_{n-1}$ falls from the high level down to the low level. The control signal $\phi_x$ may fall from the high level down to the low level at the same time as the input signal $\phi_{n-1}$ rises. However, it is preferable that the control signal $\phi_x$ fall to the low level within a time sufficient for the capacitor 11 to be discharged before the input signal $\phi_{n-1}$ rises up to the high level.

At the output terminal 13 of the inverter circuit 30, a binary output signal $\phi_n$ is obtained having an inverted form vis-a-vis the input signal $\phi_{n-1}$, and which assumes a high level ($V_{DD}$) or a low level (ground). In the circuit 30, the control signal $\phi_x$ may be externally applied. It may also comprise a pulse (level) generated within a circuit arrangement including the circuit 30.

When the control signal $\phi_x$ rises to the high level, it gradually raises the level of the gate voltage of the load transistor 8 by pre-charging the capacitor 11 through the transistor 9. At this time, since the gate of the transistor 9 is connected to the power source $V_{DD}$, the level of the gate of the load transistor 8 rises up to a level which is lower than the supply voltage $V_{DD}$ by the threshold voltage $V_{TH}$ of the transistor 9 when the control signal $\phi_x$ becomes high ($V_{DD}$).

The input signal $\phi_{n-1}$ starts to switch to the low level after passage of a period of time $t_1$ required for the charging of the capacitor 11, after $\phi_x$ has become high ($V_{DD}$). When the input signal $\phi_{n-1}$ goes low, the switching transistor 7 turns off, and the level of the output $\phi_n$ starts rising. As a result, the voltage level of the gate of the transistor 8 rises through action of the capacitor 11 beyond the level $V_{DD}$-$V_{TH}$ and further beyond $V_{DD}$. At this time, since the level of $\phi_x$—corresponding to the potential of the source of transistor 9—is at $V_{DD}$ and the level of the drain of transistor 9 is above the level $V_{DD}$-$V_{TH}$, the transistor 9 is non-conductive. Therefore, the charge in the capacitor 11 is not discharged through the transistor 9, even when the voltage of the drain of the transistor 9 exceeds that of the source of the transistor 9. Since the level of the gate of the load transistor 8 thus becomes far greater than $V_{DD}$, the level of the output signal $\phi_n$ rises up to $V_{DD}$. In this way, the inverter circuit 30 operates as a bootstrap circuit of good efficiency.

When the control signal $\phi_x$ returns to the low (ground) level, the charge stored in the capacitor 11 is rapidly discharged through the transistor 9 to the terminal 14 (at ground potential). Consequently, the gate voltage level of the load transistor 8 decreases and the load transistor 8 turns off. In order to discharge the capacitor 11 in advance to speed up operation of the inverter 30, it is preferable that the control signal $\phi_x$ attains its low level within a time $t_2$ sufficient for the capacitor 11 to be discharged before the input signal $\phi_{n-1}$ switches to the high level. When the input signal $\phi_{n-1}$ goes high, the switching transistor 7 becomes conductive (on), and the output $\phi_n$ becomes low, with the circuit 30 consuming no power.

The circuit 30 can raise the gate level of the load transistor 8 to a sufficiently high level at the initial stage during which the output $\phi_n$ starts rising, so that the circuit 30 can satisfactorily exploit the bootstrap mechanism of the inverter circuit 20 in FIG. 1. In addition, the circuit 30 has the features that, when $\phi_x$ decreases to its low voltages, the gate level of the transistor 8 can be quickly made low via the transistor 9, and that, when the output $\phi_n$ is at the low level, the circuit consumes no power.

Figure 4:
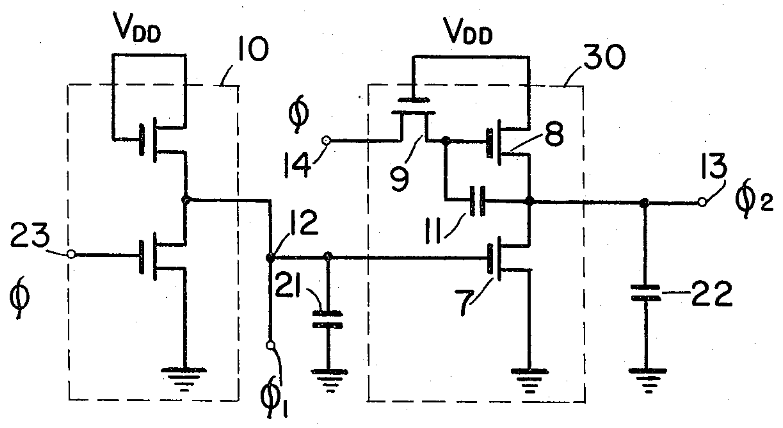
FIG. 4 is a schematic diagram showing example exmple of circuit arrangement in which the circuitry of the present invention is applied.
Figure 5:
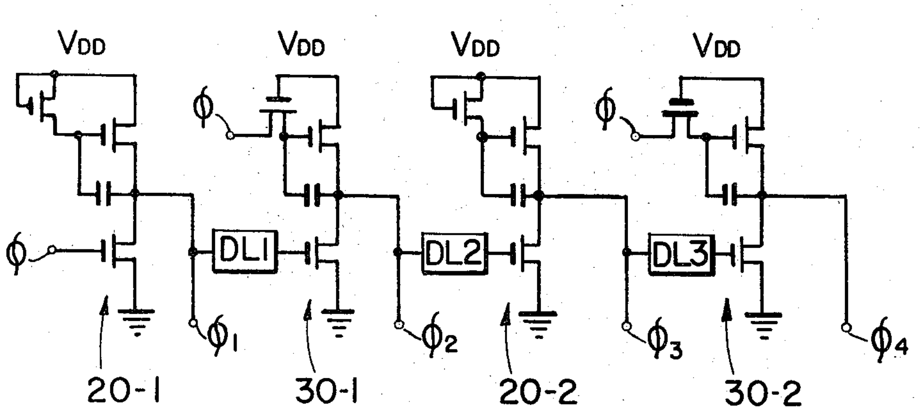
FIG. 5 is a diagram showing another illustrative example of the application of the present invention.

Examples of circuit arrangement to which the circuit of the present invention is applied are illustrated in FIGS. 4 and 5. The circuit arrangement shown in FIG. 4 is constructed such that the following stage bootstrap circuit 20 of FIG. 1 is replaced by the FIG. 2 bootstrap circuit 30 of the present invention. A capacitor 21 connected between the input terminal 12 of the inverter 30 and ground is the load capacitance of the output $\phi_1$ of the first stage inverter circuit 10, while a capacitor 22 connected between the output terminal 13 of the inverter 30 and ground is the load capacitance for the output $\phi_2$ of the succeeding stage inverter circuit 30. An input signal $\phi$ is impressed upon the input terminal 23 of the first-stage inverter 10, and is also applied as a control signal to the control terminal 14 of the succeeding stage inverter 30. When the input signal $\phi$ is at the low level, the output $\phi_1$ of the first-stage inverter circuit 10 is high. This output $\phi_1$ is delayed by the output capacitor 21, and is applied to the succeeding stage inverter as its input signal. Thus, the control signal $\phi$ and the input signal $\phi_1$ meet the requirements imposed thereupon, because the signal $\phi_1$ has an inverted and delayed form with respect to the signal $\phi$. For the assumed conditions, the output $\phi_2$ of the inverter circuit 30 succeeding stage is low. Therefore, the entire circuit arrangement does not consume any power. When the input signal $\phi$ goes high, the succeeding stage inverter circuit 30 functions as a bootstrap circuit of good efficiency as has been explained above in connection with the circuit of FIG. 2, and pulls up the output $\phi_2$ to the level of the supply voltage $V_{DD}$.

In an arrangement such as a memory circuit, which is retained in a fixed state for a long period of time and is subjected to a selective operation for a short period of time, power consumption during quiescent information storage can be made zero by using the signal $\phi_1$ for a signal requiring a high level during storage and $\phi_2$ for a signed requiring the low level.

In the circuit arrangement in FIG. 4, the capacitance of the capacitor 21 is preferably made such that the input signal applied to succeeding stage inverter 30 is delayed by the period $t_1$ or $t_2$ shown in FIG. 3 with respect to the control signal $\phi$, to assure completion of charging or discharging of the capacitor 11 in the inverter 30.

FIG. 5 shows a circuit arrangement in which bootstrap circuits 20-1 and 20-2 of the prior art type shown in FIG. 1, and bootstrap circuits 30-1 and 30-2 of the invention as shown in FIG. 2, are alternately connected in cascade, through delay circuits $DL_1$, $DL_2$ and $DL_3$, to constitute a four-stage inverter. The input signal causes output signals $\phi_1$, $\phi_2$, $\phi_3$, and $\phi_4$ to sequentially operate. The output signals $\phi_1$, $\phi_2$, and $\phi_3$ of the inverters 20-1, 30-1 and 20-2 are delayed by the delay circuits $DL_1$, $DL_2$ and $DL_3$ and applied as the respective input signals to the next-stage inverters 30-1, 20-2 and 30-2, respectively. The non-delayed signal $\phi$, which is the same as the input signal, is applied as a control signal to each of the inverters 30-1 and 30-2. When the signal $\phi$ is low, the entire circuit arrangement consumes no power. The outputs $\phi_2$ and $\phi_4$, under the control of the pulse $\phi$ can be made sufficiently high in level by the bootstrap operations. Although the case of the four stages has been exemplified above, it can be expanded into the general case where any plurality of inverter circuit stages are connected in cascade in which high and low levels are alternately present. As an example of each of the delay circuits $DL_1$, $DL_2$ and $DL_3$, a capacitor as illustrated in FIG. 4 can be employed.

In accordance with the bootstrap inverter circuit of the present invention, it is possible to negate power consumption, not only when the output is at the high level, but also when it is low. In particular, where a number of inverter stages are interconnected, the power consumption of the entire circuit arrangement can be made zero. Therefore, the circuit of the invention is very preferably when it is fabricated in the form of an integrated circuit.

Although N-channel type MOS transistors have been employed in the above description, it is to be understood that P-channel type MOS transistors can be employed as well, changing the polarities of the respective potentials. With respect to the point that power consumption becomes low, the subject matter of the present invention obtains even if the switching device 7 is a transistor other than the IGFET, for example, a bipolar unit. In such case, the gate (control electrode), source and drain of the switching transistor 7 are replaced by the base, emitter and collector of the bipolar transistor, respectively.

The above-described arrangement is merely illustrative of the principles of the present invention. Numerous modifications and adaptations thereof will be readily apparent to those skilled in the art without departing from the spirit and scope of the present invention.

What is claimed is:

1. A circuit arrangement comprising a first inverter circuit having an input terminal and an output terminal, a second inverter circuit having an input terminal connected to the output terminal of said first inverter circuit, a control terminal and an output terminal, means coupled to said output terminal of said first inverter circuit for delaying the output of said first inverter circuit, and a power supply, said first inverter circuit further having a first insulated-gate field effect transistor connected between one terminal of said power supply and said output terminal of said first inverter, and a first switching transistor having a control electrode and connected between said output terminal of said first inverter and the other terminal of said power supply, said control electrode of said first switching transistor being connected to said input terminal of said first inverter, said second inverter circuir further having a second insulated-gate field effect transistor being connected between said one terminal of said power supply and said output terminal of said second inverter, a third insulated-gate field effect transistor being connected between said control terminal and the gate of said second insulated-gate field effect transistor, the gate of said third insulated-gate field effect transistor being connected to said one terminal of said power supply, a second switching transistor having a control electrode and connected between said output terminal of said second inverter and said other terminal of said power supply, said control electrode of said second switching transistor being connected to said input terminal of said second inverter circuit, and a first capacitor connected between said output terminal of said second inverter circuit and the gate of said second insulated-gate field effect transistor.

2. The circuit arrangement of claim 1, wherein the gate of said first insulated-gate field effect transistor is connected to said one terminal of said power supply.

3. The circuit arrangement of claim 1, wherein said first inverter circuit further includes a fourth insulated-gate field effect transistor connected between said one terminal of said power supply and the gate of said first insulated-gate field effect transistor, and a second capacitor connected between the gate of said first insulated-gate field effect transistor and said output terminal of said first inverter circuit, the gate of said fourth insulated-gate field effect transistor being connected to said one terminal of said power supply.

4. The circuit arrangement of claim 1, further comprising means for supplying an input signal for said circuit arrangement to said input terminal of said first inverter circuit and to said control terminal of said second inverter circuit, and said delaying means delays the output of said first inverter circuit by a time sufficient for said first capacitor to become charged.

* * * * *